(12) United States Patent
Buchanan et al.

(10) Patent No.: US 9,410,801 B2
(45) Date of Patent: Aug. 9, 2016

(54) SCANNER

(75) Inventors: Alastair Buchanan, Great Boughton (GB); John Mitchell, Menal Bridge (GB)

(73) Assignee: Cadscan Limited, Chester (GB)

( * ) Notice: Subject to any disclaimer, the term of this patent is extended or adjusted under 35 U.S.C. 154(b) by 421 days.

(21) Appl. No.: 14/005,665

(22) PCT Filed: Mar. 15, 2012

(86) PCT No.: PCT/GB2012/000244
§ 371 (c)(1),
(2), (4) Date: Dec. 4, 2013

(87) PCT Pub. No.: WO2012/123703
PCT Pub. Date: Sep. 20, 2012

(65) Prior Publication Data
US 2014/0085424 A1    Mar. 27, 2014

(30) Foreign Application Priority Data

Mar. 17, 2011 (GB) .................................. 1104529.1
Jan. 18, 2012 (GB) .................................. 1200776.1

(51) Int. Cl.
*H04N 13/02* (2006.01)
*G01B 11/25* (2006.01)

(52) U.S. Cl.
CPC .......... *G01B 11/254* (2013.01); *G01B 11/2527* (2013.01); *H04N 13/02* (2013.01)

(58) Field of Classification Search
CPC .............................. G01B 11/254; H04N 13/02
See application file for complete search history.

(56) References Cited

U.S. PATENT DOCUMENTS

| 6,455,835 | B1* | 9/2002 | Bernardini | G06T 7/0067 250/208.1 |
| 7,525,669 | B1 | 4/2009 | Abdollahi | |
| 2006/0077398 | A1* | 4/2006 | Cantin | G01B 11/25 356/512 |
| 2007/0115484 | A1* | 5/2007 | Huang | G01B 11/2527 356/604 |
| 2011/0298896 | A1* | 12/2011 | Dillon | G02B 27/48 348/46 |
| 2012/0154618 | A1* | 6/2012 | Markovic | G06T 15/205 348/222.1 |

FOREIGN PATENT DOCUMENTS

| EP | 2272417 A1 | 12/2011 |
| WO | WO 2005119449 A3 | 4/2007 |
| WO | WO 2010012838 A1 | 4/2010 |

OTHER PUBLICATIONS

EPO—International Search Report, Jul. 11, 2012.

* cited by examiner

*Primary Examiner* — Dave Czekaj
*Assistant Examiner* — Nam Pham
(74) *Attorney, Agent, or Firm* — Dority & Manning, P.A.

(57) ABSTRACT

A method for 3D imaging using phase shifted structured light, in which projection means project multiple phase shifted mask images of a transmission mask on to an object scene, the mask images being captured by a camera to form a camera image, depth information being derived from the camera image by measurement of the camera image and computation from the measurement for each of the phase shifted fringe patterns and a 3D scanner carrying out the method.

16 Claims, 4 Drawing Sheets

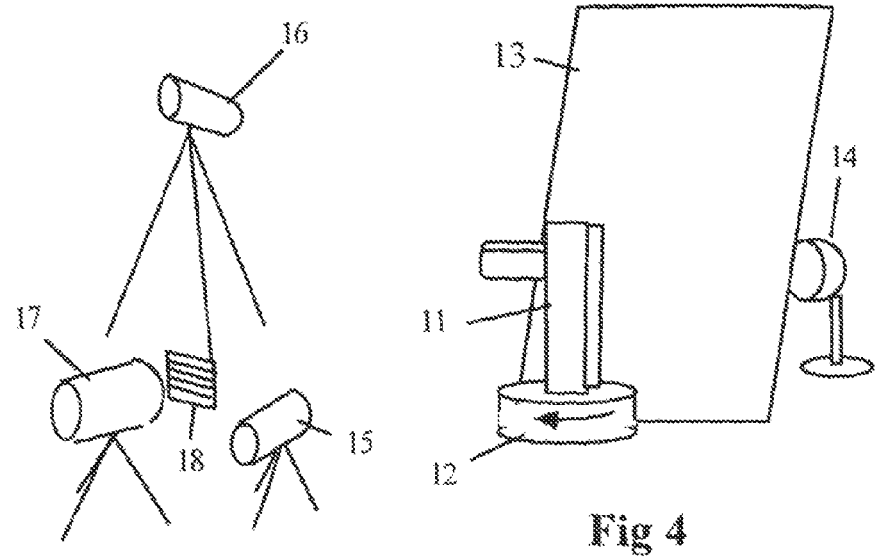
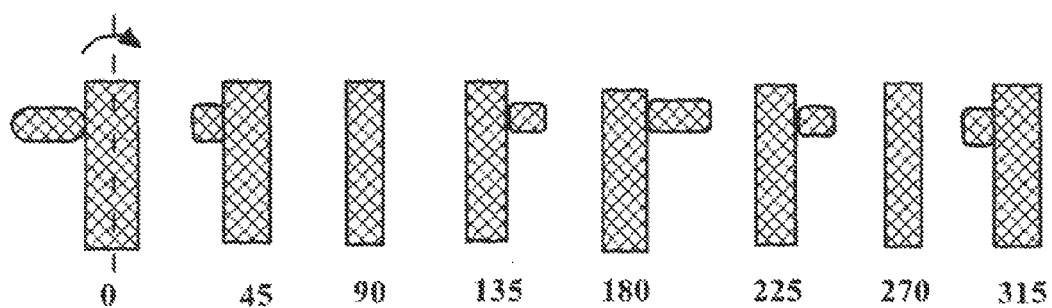
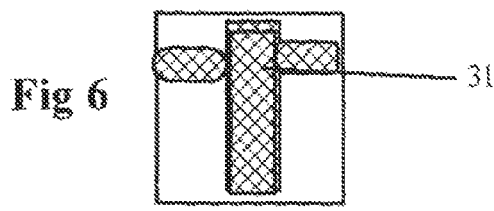

SCANNER

This invention relates to 3D scanners, which is to say scanners that can record 3D information about an object or a scene that can be used to recreate a three-dimensional image or representation of the object or scene imaged.

There are numerous methods for 3D scanning, among which may be mentioned:

time-of-flight, in which the difference in the time taken for light to travel to and from different points on the surface of the object or scene to be scanned is measured and used to compute the positions in three dimensions of the surface points;

triangulation, in which distances are computed from different vantage points, as in binocular vision;

modulated light, in which the object is illuminated by a time-varying light;

space carving, in which the shape of an object is derived from measurements of multiple silhouettes, and colour is added back into the silhouettes for a final image;

structured light, in which a projector illuminates the object with a pattern of light, imaged from a position away from the axis of projection, and distortions in the pattern due to the shape of the object are measured;

None of these methods gives a completely satisfactory result. Methods that project structured light onto the object suffer from confusing subsurface scattering and reflections that are often addressed by coating the object in a white powder, which is not always practicable. Space carving, in contrast, uses only binary information about the object's shape, and does not suffer from any surface reflection, scattering or texture issues. However, it cannot detect surface cavities and produces a relatively low-resolution model.

Time-of-flight scanning involves illumination with a pulsed, or otherwise modulated, light source measuring, for each pulse or modulation period, the time taken to be reflected from the surface of the object at which it is aimed. The scanner is expensive and clearly not suitable for a wide range of scanning problems, being much more adapted to imaging over long distances than distances of the order of a few centimetres, where the time of flight is extremely short.

For conventional structured light techniques such as 3 phase scanning, there are additional problems associated with phase unwrapping and reconstruction, particularly on discontinuous surfaces. These techniques, moreover, calculate depth using triangulation, and calibrating the camera and projector for this is problematic.

The present invention provides methods and apparatus for structured light 3D scanning that give improved results, yet involve no costly equipment.

The invention comprises a method for imaging a scene using two different methods for 3D imaging and forming a 3D image from the products of both methods, characterised in that one method comprises a phase shifted structured light method.

The invention also comprises a phase shifted structured light method, in which a stationary transmission mask is projected on to the object scene from multiple illumination positions and imaged by a camera, depth information being derived from the image by measurement of the illumination intensity from the camera image and computation from the measured intensity for the image projected from each illumination position.

The projection means comprise separate illuminants at the projection positions, or one illuminant moving between the illumination positions.

This method is particularly useful in combination with a different, but complementary method for 3D imaging, such, for example, as space carving or triangulation. Results from the two methods are combined to give an image free from ambiguities, each 'covering' for discontinuities in the other.

Or, a stationary transmission mask may be projected on to the object scene from multiple illumination positions and imaged by a camera, depth information being derived from the image by measurement of the illumination intensity from the camera image and computation from the measured intensity for the image projected from each illumination position.

The transmission mask may be a sinusoidal mask, that is to say, one having a transmission function $f(y)=c$, $f(x)=\sin x$.

The transmission mask may be projected from a number of different projection positions for example from three projection positions, or, when the mask moves relative to a stationary illuminant, it may have three mask positions. A sinusoidal mask may be projected from positions spaced apart in a direction parallel to the x axis. The positions may be spaced apart by a distance less than or equal to the period of $f(x)$, which will give an infinite z range with no singularity, or by more than the said period, which will give a finite range with no singularity, which in practice will be an adequate arrangement, as a larger distance gives improved z determination.

The camera may be a high-resolution camera. The camera may be offset from the projection positions.

The mask image captured by the camera will show, at any point in the scene, a phase shift from a notional image in an x,y plane, depending on the depth of the point with regard to the plane. In a pixel image, the phase shift is measured for each pixel and used to calculate its z position.

The projection means may comprise separate illuminants at the projection positions. The illuminants may be operated sequentially so as to create different mask images. The illuminants may comprise LEDs, which may be white LEDs. Of course, a single illuminant may be used, displaced between the projection positions, though an arrangement with no moving parts will be less expensive and have fewer maintenance requirements. The invention also comprises a 3D scanner comprising:

a fringe pattern projector adapted to project a fringe pattern on to an object scene from multiple illumination positions;

a camera adapted to form images of the object scene when illuminated with the fringe pattern projected from each position, and to measure the illumination intensity at positions in the images; and computation means adapted to compute depth information for said positions from the measured intensities.

The fringe pattern projector may comprise a transmission mask with illuminant means. The transmission mask may comprise a sinusoidal mask. The illuminant means may comprise LEDs, and may comprise three linear LED arrays spaced apart in a direction parallel to the y-axis of the mask, and so parallel to the fringe direction. The camera may be a high definition camera, and may be offset from the fringe pattern projector.

Unlike other phase shift methods (such as 3 phase imaging) the output does not suffer from phase discontinuities, within a depth range determined by the period of the sinusoidal mask and the spacing of the linear LED arrays, and can be implemented using simple lighting and control electronics. This leads to an extremely cost effective solution Multiple units can be used in the scanning system to cover almost the entire object apart from its base.

However, the phase shifted structured light method may according to the invention be combined with another method for 3D imaging, particularly space carving, in which silhouettes are recorded by one or more cameras against a backlit screen, and colour images are also made at the same time for different rotational positions of an object. Images of the background screen may also made without the object present to provide a reference The background may be subtracted from the silhouette images to leave, from the or each camera, a series of binary silhouettes from which an envelope is constructed, being the total volume within which voxels of the object image are constrained.

Individual voxels may then be confirmed by sequential comparison of the total volume with the individual silhouettes and, if not confirmed, 'carved' out, resulting in a data set of x, y and z positions for each voxel appearing on the surface of the object.

The colour images may then be repainted onto the silhouettes, averaging values where there is disagreement between individual images, and the surface extracted in the form of a point cloud and 3D mesh.

Methods for 3D scanning and a 3D scanner according to the invention will now be described with reference to the accompanying drawings, in which:

FIG. 4 is a perspective view of one embodiment of apparatus for imaging by space carving and 3 phase structured light;

FIG. 5 is a series of images produced during a space carving step; and

FIG. 6 is the x, y, z envelope containing all the images of FIG. 5.

The drawings illustrate a method for 3D scanning in which a transmission mask 22 is projected on to the object scene 25 from multiple positions LED 1, 2 and 3, and of which an image is formed by a camera 21, depth information being derived from the image by measurement of the illumination intensity from the image and computation from the measured intensity for the image projected from each position LED 1, 2 and 3.

The mask 22 is a sinusoidal mask, that is to say, one having a transmission function f(y)=c, f(x)=sinx.

Figure 1:
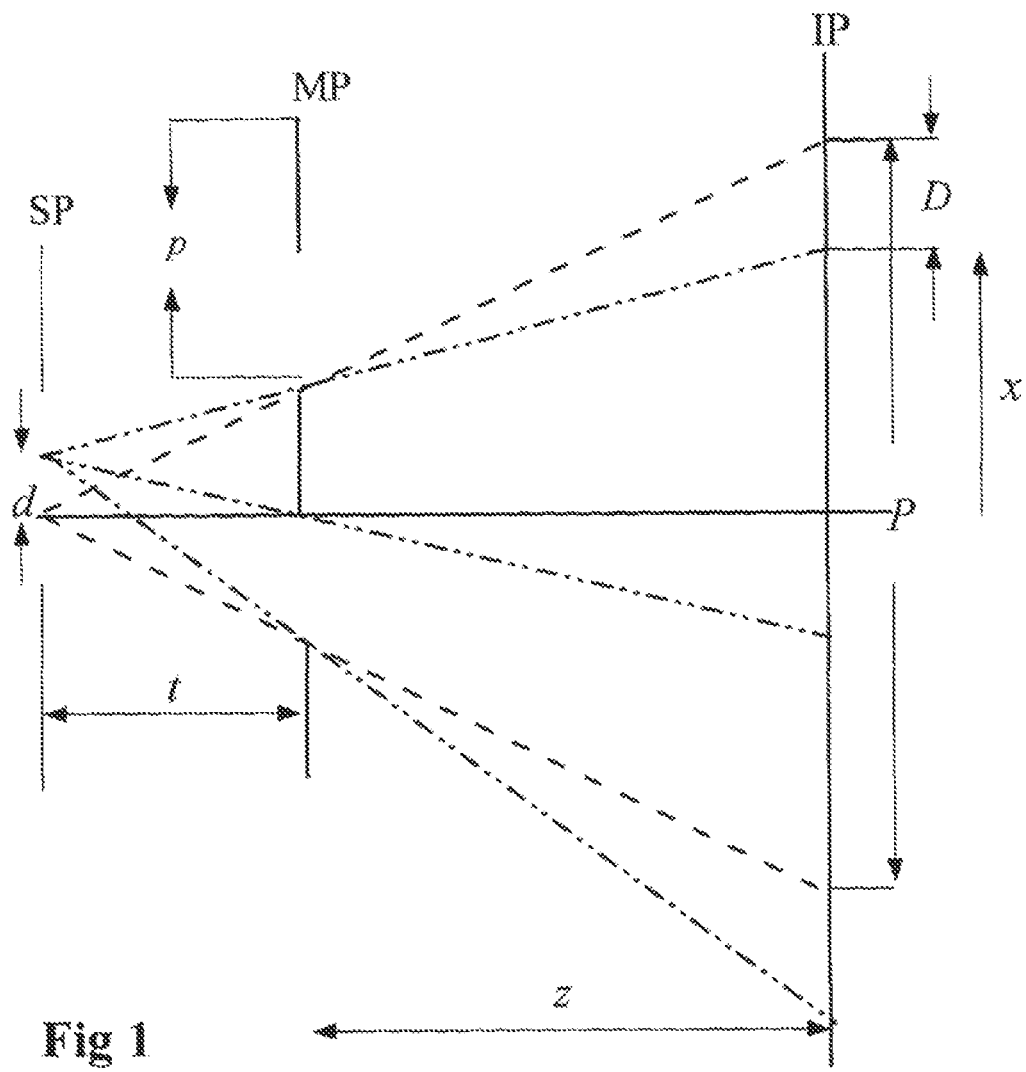
FIG. 1 is a diagrammatic representation of the scanner geometry.

The camera 21 is a high-resolution camera. The camera may be offset from the projection positions. This ensures that the camera does not cast a shadow on the object scene, The mask image captured by the camera will show, at any point in the scene, a phase shift from a notional image in an x,y plane, depending on the depth of the point with regard to the plane. In a pixel image, the phase shift is calculated for each pixel and used to calculate its z position, The phase shift is calculated from the illumination intensity and the geometry of the system. With reference to FIG. 1, the intensity in the image plane IP due to a source at x=0 will be
for d=0

$I_d = I_0 + R(\cos\theta)$ where $\theta = 2\pi x/p$ for d≠0, $I_d = I_0 + R(\cos\theta + \alpha)$ $\alpha = f(z, d)$ $I_0$ is dependent on the source intensity, which is assumed to be independent of d, R is dependent on the object reflectivity. These are functions of x and y, and constant for each pixel.

z is determined by measuring I with at least three different values of d, that is to say, from at least three successive illuminations by LED 1, LED 2 and LED 3, together with further LEDs if used. We have then three equations with three unknowns, $I_0$, R, α for different values of d:

$I_1 = I_0 + R(\cos\theta - \alpha)$ $I_2 = I_0 + R(\cos\theta)$ $I_3 = I_0 + R(\cos\theta + \alpha)$ α is the phase shift which equals 2πD/P, so $\alpha = 2\pi . z/(z+1) d/p$ from which z can be determined.

With d/p=1, the range of z with no singularity is infinite, However, the rate of change of I with z is small. Contrast and hence resolution will be improved if d/p is greater than 1, e.g. 1.5, 2, or 2.5. Useful ranges of z without ambiguity may be available depending on the geometry of the arrangement,.

The Hariharan algorithm used in phase shift calibration in interferometry may also be used. Four measurements are made with 2α, α, −α, −2α, then:

$I_1 = I_0 + R(\cos\theta + 2\alpha)$ $I_2 = I_0 + R(\cos\theta + \alpha)$ $I_4 = I_0 + R(\cos\theta - \alpha)$ $I_5 = I_0 + R(\cos\theta - 2\alpha)$ $I_3(\alpha=0)$ is not used,
This yields $\alpha = \cos^{-1}[\frac{1}{2}(I_5 - I_1)/(I_4 - I_2)]$ For some values of θ (positions in x), $(I_4 - I_1) \to 0$, giving a singularity. However, two sets of measurements may be made with θ shifted by 90°, and α calculated from the set (at each pixel) with the larger value of $(I_4 - I_1)$. Otherwise, the values may be weighted proportionally.

A further possibility is to use the Carré algorithm to compute the phase shift. This uses four phases: −3α, −α, α, 3α (steps of 2α).
Then:

$\alpha = \tan^{-1}[(3((I_2 - I_3) - (I_1 - I_4))/((I_2 - I_3))]^{1/2}$

This also has singularities when the denominator→0, but not in the same place as the Hariharan algorithm. Thus it is possible to use five shifts and calculate the phase three times, once by Hariharan, twice by Carré. More than five shifts may be used, with correspondingly more calculations, in order to further reduce noise. The calculations can be weighted by denominator, Other algorithms can be used, of course, Hariharan and Carré being just examples used in interferometry.

A practical instrument comprises a camera with a horizontal field of vision of 66° and a vertical field of vision of 40°. If the volume of the object scene is 200×200×200 mm, the camera would be placed 275 mm from the nearest face of that volume, and the farthest face would then be 475 mm from the camera, assuming the camera to be in the mask plane. However, the scanning approach is flexible, the geometry being capable of selection trading off accuracy, resolution, range and scanner sixe for different applications.

Instead of sequential illumination from the different illumination positions, the illuminant(s) may be fixed and the mask moved. Or differently structured light may be used. For example, a different light colour may be used at each illumination position, so that the camera picks up all the fringe images together but is able to distinguish them by colour. Or light intensity may be modulated at different frequencies (none of which is an integral multiple of another), and the images separated electronically by band pass filters.

The method may be used in combination with space carving as illustrated in FIGS. 4, 5 and 6.

In the space carving stage, an object 11 to be imaged is imaged on a turntable 12 on which it may be rotated through 360°. The rotation is typically carried out in steps, typically of 10°, but here of 45° for simplicity's sake. The object 11 is imaged against a background screen 13.

Figure 2:
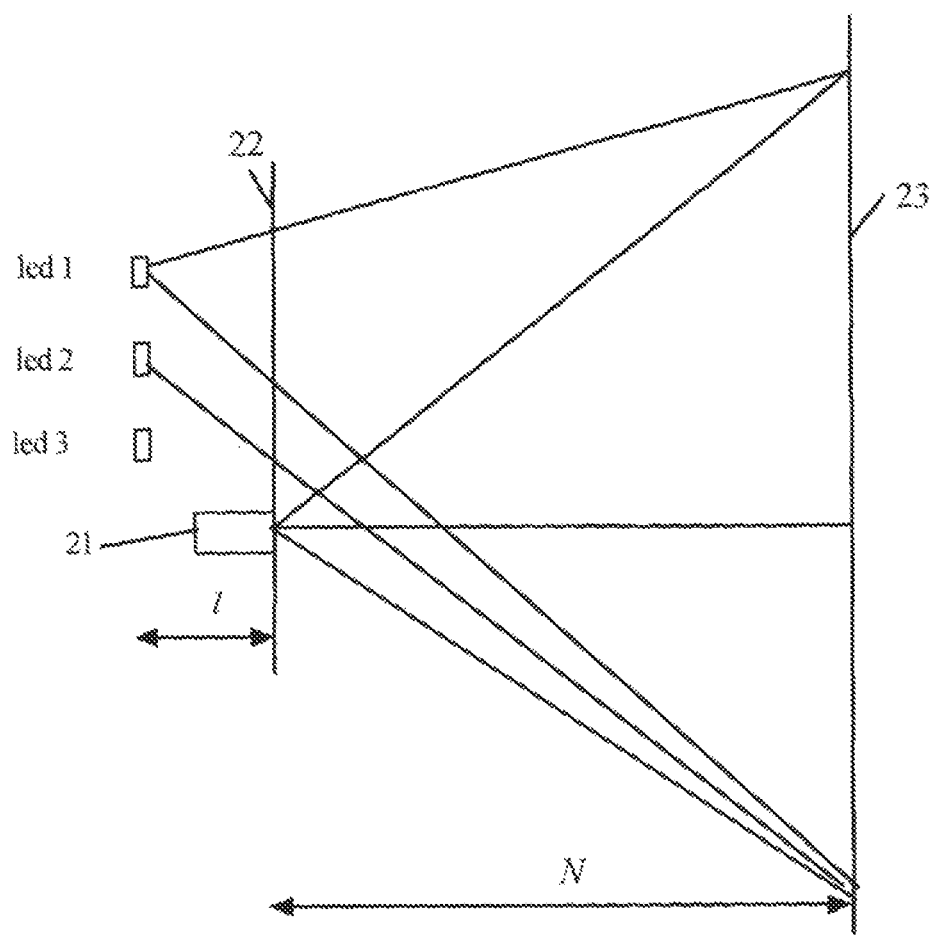
FIG. 2 is a diagrammatic plan view of the scanner arrangement.

Silhouettes are recorded by cameras 15 and 16 against the screen 13 with backlight 14, and colour images are also made at the same time for each of the rotational positions of the object 11. Images of the background screen 13 are also made without the object 11 present to provide a reference. FIG. 2 shows a series of silhouettes produced at 45° intervals.

Figure 3:
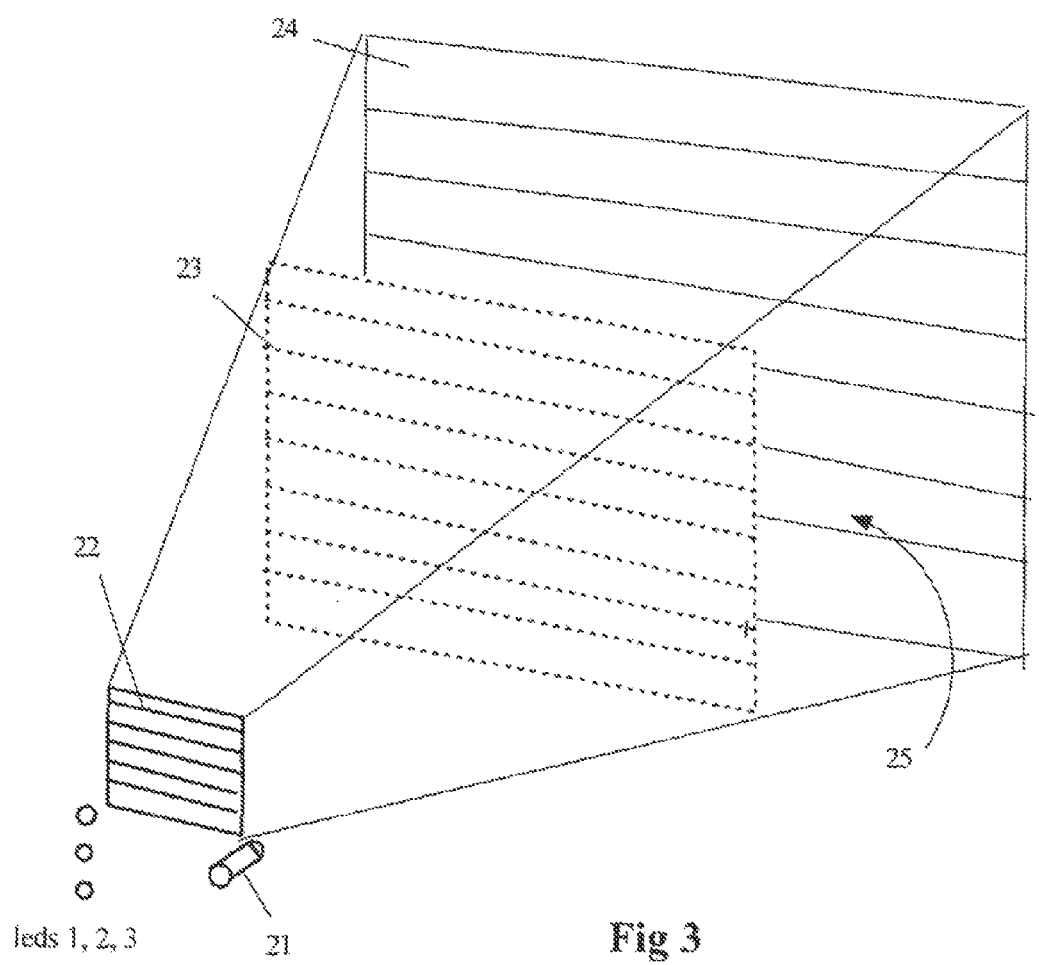
FIG. 3 is a perspective view of the arrangement of FIG. 2.

Subtracting the background from the silhouette images leaves, from each of the cameras 15, 16, a series of binary silhouettes from which an envelope 31, FIG. 3, can be constructed, being the total volume within which voxels of the images are constrained. Individual voxels are then confirmed by sequential comparison of the total volume with the individual silhouettes and, if not confirmed, are 'carved' out, resulting in a data set of x, y and z positions for each voxel appearing on the surface of the object.

The colour images are then repainted onto the silhouettes, averaging values where there is disagreement between individual images, and the surface extracted in the form of a point cloud and 3D mesh.

The phase shifted structured light measurements can be made when the space carving measurements are done, and the results from the two methods combined to cover any ambiguities in the results of the individual methods.

The invention claimed is:

1. A method for 3D imaging using phase shifted structured light, in which projection means project multiple phase shifted mask images of a transmission mask on to an object scene, the mask images being captured by a camera to form a camera image, depth information being derived from the camera image by measurement of the camera image and computation from the measurement for each of the phase shifted mask images, in which a stationary transmission mask is projected on to the object scene from multiple illumination positions and the projection means comprise separate illuminants at the illumination positions and the illuminants are operated sequentially so as to create different mask images.

2. A method according to claim 1, in which the illuminants comprise LEDs, which may be white LEDs.

3. A method according to claim 1, in which the transmission mask is a sinusoidal mask, that is to say, one having an x-axis and transmission function $f(y)=c$, $f(x)=\sin x$, where y is the transparency and c is a constant.

4. A method according to claim 1, in which the illumination positions are spaced apart in direction parallel to the x-axis.

5. A method according to claim 1, in which the number of phase shifted images is at least three.

6. A method according to claim 5, in which the illumination positions are spaced apart by a distance less than or equal to the period of $f(x)$, to give an infinite z range with no singularity.

7. A method according to claim 5, in which the positions are spaced apart by more than the period of $f(x)$, to give a finite z range with no singularity.

8. A method according to claim 1, in which the camera is a high-resolution camera.

9. A method according to claim 1, in which the camera is offset from the illumination position(s).

10. A method according to claim 1, in which there are four illumination positions and a Hariharan algorithm used in the depth calculation.

11. A method according to claim 1, in which there a four Illumination, respectively mask positions and a Carré algorithm used in the depth calculation.

12. A method according to claim 1, in which there are five illumination positions and Hariharan and Carré algorithms are used in the depth calculation.

13. A phase shifted structure light 3D scanner comprising:
a fringe pattern projector comprising illuminant means adapted to project phase shifted fringe patterns on to an object scene, in which a stationary transmission mask is projected on to the object scene from multiple illumination positions and the projection means comprise separate illuminants at the illumination positions and the illuminants are operated sequentially so as to create different mask images;
a camera adapted to form a camera image of the object scene when illuminated with the fringe patterns, and measurement means to measure the camera image; and
computation means adapted to compute depth information for said positions from the measurements for the image projected from each of the phase shifted fringe patterns.

14. A scanner according to claim 13, in which the transmission mask comprises a sinusoidal mask.

15. A scanner according to claim 13, in which the illuminant means comprise LEDs.

16. A scanner according to claim 13, in which the camera is a high definition camera.

* * * * *